(12) United States Patent
Botham et al.

(10) Patent No.: US 7,624,034 B2
(45) Date of Patent: Nov. 24, 2009

(54) METHOD FOR RECEIVING AND RECONCILING PHYSICAL INVENTORY DATA AGAINST AN ASSET MANAGEMENT SYSTEM FROM A REMOTE LOCATION

(75) Inventors: Robert A. Botham, Calgary (CA); Lorna M. Murray, Calgary (CA)

(73) Assignee: Hewlett-Packard Development Company, L.P., Houston, TX (US)

( * ) Notice: Subject to any disclaimer, the term of this patent is extended or adjusted under 35 U.S.C. 154(b) by 1820 days.

(21) Appl. No.: 09/997,340

(22) Filed: Nov. 29, 2001

(65) Prior Publication Data
US 2003/0101108 A1 May 29, 2003

(51) Int. Cl.
G06F 17/40 (2006.01)
G06Q 10/00 (2006.01)

(52) U.S. Cl. .................. 705/7; 705/8; 705/22; 705/28; 235/385; 340/5.92

(58) Field of Classification Search ............... 705/28, 705/22, 1, 7, 8; 235/385; 340/5.92
See application file for complete search history.

(56) References Cited

U.S. PATENT DOCUMENTS

| | | | | |
|---|---|---|---|---|
| 5,590,197 | A * | 12/1996 | Chen et al. | 705/65 |
| 5,640,002 | A * | 6/1997 | Ruppert et al. | 235/462.46 |
| 5,664,110 | A * | 9/1997 | Green et al. | 705/26 |
| 6,021,392 | A * | 2/2000 | Lester et al. | 705/2 |
| 6,154,738 | A * | 11/2000 | Call | 707/4 |
| 6,295,540 | B1 * | 9/2001 | Sanschagrin et al. | 707/201 |
| 6,325,283 | B1 * | 12/2001 | Chu et al. | 235/375 |
| 6,609,090 | B1 * | 8/2003 | Hickman et al. | 704/9 |
| 6,662,193 | B1 * | 12/2003 | Christensen | 707/104.1 |
| 6,938,027 | B1 * | 8/2005 | Barritz et al. | 706/50 |
| 6,941,361 | B1 * | 9/2005 | Fink et al. | 709/223 |
| 2002/0188430 | A1 * | 12/2002 | Benny et al. | 703/7 |
| 2003/0055749 | A1 * | 3/2003 | Carmody et al. | 705/28 |

FOREIGN PATENT DOCUMENTS

WO WO 97/44749 * 11/1997

OTHER PUBLICATIONS

White, Ron, How Computers Work, Millennium Ed. Que Corporation, Sep. 1999.*

(Continued)

*Primary Examiner*—Albert DeCady
*Assistant Examiner*—Dave Robertson

(57) ABSTRACT

The patent discloses a system and related method for taking, receiving and reconciling physical inventory data against an asset management system from a remote location. In the disclosed system, assets as well as their locations are scanned using a hand held bar code scanner. Scanner information is uploaded to a particular location on a web server. Once transferred, the scanner files are converted to an intermediate database. Individual records of the intermediate database are then compared against their corresponding records, if any, in a main asset database by way of a web user interface. Records are modified, rejected or accepted by way of the web user interface, and then accepted records are written to the main asset database. In this way, multiple steps of the reconciliation process may take place at the same time, and reconciliation may be done quickly and efficiently, even from a remote location.

33 Claims, 4 Drawing Sheets

OTHER PUBLICATIONS

Derfler, Frank J. et. al. How Networks Work, Millennium Ed., Que Corporation, Jan. 2000.*

Gralla, Preston, How the Internet Works, Millennium Ed., Que Corporation, Aug. 1999.*

Horngren, Charles T., et. al., Introduction to Financial Accounting, Revised 3rd Ed., Prentice-Hall, Inc., 1988.*

Borland's Paradox for Windows User's Guide, Borland International, Inc, 1994.*

Borland's ReportSmith for Windows User's Guide, Borland International, Inc, 1994.*

Ekman, Suzanne. Bar Coding Fixed Asset Inventories. Management Accounting, Dec. 1992; vol. 74, No. 6, p. 58.* xAssets xAM Asset Management Software—Overview [downloaded from www.wayback.com on Apr. 2, 2007], 2 pgs.*

Knaster, Barry. Fixed assets: Picking the right tool. Accounting Technology, Nov. 2001, vol. 17, No. 19, p. 34-40 (even).*

TRW takes best approach to managing its assets. Management Accounting: Nov. 1996, vol. 78, No. 5, pp. 54-55.*

* cited by examiner

METHOD FOR RECEIVING AND RECONCILING PHYSICAL INVENTORY DATA AGAINST AN ASSET MANAGEMENT SYSTEM FROM A REMOTE LOCATION

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention relates generally to receiving and reconciling physical inventory data with the data stored in an asset management system. More particularly, the preferred embodiments are directed to receiving and reconciling physical inventory data related to computing resources against an asset management database of those computing resources.

2. Background of the Invention

In industries where assets of a corporation have long life spans and are not very portable, keeping an up-to-date asset management database is relatively simple. Periodically, a person or persons may take printouts or spreadsheets of the asset management database to the various affected corporate offices and verify the existence and location of these long-life span, non-portable assets. Once all the assets are found, or their dispositions determined, the person or persons may simply take the printout or spreadsheet of the asset management database back to a home office computer and update the information.

While these techniques may work well in some industries, tracking computer and computing assets in this way is wholly insufficient. Reconciling the physical inventory against the asset management database in the prior art, the manual method, may take three months or more to complete, including the time it takes to complete the physical inventory, as well as the time to manually reconcile each database entry against what was collected in the physical inventory. Three months worth of time for computing resources is very long, resulting in the movement, obsolesce, and replacement of a significant number of the computing resources before a manual method reconciliation can be completed. That is, because of the speed at which computing resources are outdated by advances in the computer industry and replaced, and also given the fact that the computing industry as a whole is moving towards smaller and more portable devices, these methods of reconciling the physical inventory of computing resources against those contained in an asset management database are insufficient.

Thus, what is needed in the art is a way to reconcile the physical inventory of computing resources against the entries in an asset management database very quickly, so that the asset management database is truly representative of the quantity, location, ownership and types of computing resources within the company.

BRIEF SUMMARY OF THE INVENTION

The problems noted above are solved in large part by a method and related system for reconciling a physical inventory of computing assets against corresponding entries in an asset management database. Preferably, the physical inventory is taken using a hand held scanning device. Each computing resource within the company or within the particular site of the company is preferably marked with bar codes that indicate both the serial number of the device as well as an asset number. Thus, for example, a computer in a particular work area may be scanned using the held device, and in just a matter of moments, the serial number and asset code for that device are stored in the scanner. The method also preferably involves marking each location or work area with a bar code such that the location of the computing resource may be entered into the scanner by scanning that related bar code. The location bar code may also include owner name information, or provide an index to supply the owner name information indirectly. Once the physical inventory is complete, or many times throughout the process if the company or site is large, the information in the scanner is up-loaded, preferably using an FTP program, to a directory on a web-based site. A conversion program preferably monitors that location on the web-based site, and upon the presence of files from the scanner containing asset information, scanner files, the program preferably converts that information into an intermediate SQL database. At roughly the same time, a copy of the main asset management database is made.

Once each of the intermediate database and copy of the most current or main asset management database are available, a web-based interface is invoked which allows the user to compare entries from the intermediate database to those of the most current copy of the main asset management database. Preferably, similar records are pulled based on having similar asset codes; however, any of the database entries may be useable in pulling these similar records. Once the two similar records are compared, the user, again using the web-based interface, makes any necessary changes and accepts or rejects the overall record. Once accepted, a program periodically executed on the web server updates information in the main asset management database based on the information contained in each accepted record.

Thus, a person or persons taking physical inventory can not only perform the physical aspects of that inventory, but because the steps of reconciling the data with old asset management information may be done using the web-based viewer, it is possible that updates to the main asset management database can be done very quickly with respect to the physical inventory. Indeed, depending upon the size of the company or site and the number of people performing the physical inventory, it is possible to have the main asset management database up-to-date within a single day or less.

A second aspect of the invention addresses identifying assets that were not found in the physical inventory. In particular, this aspect of the invention involves modifying the main asset management database to include some identifying indicia in each record, preferably appending a "WH" to the end of each seat or location code, such that the original entries in the main asset management database are identifiable. The location, which may also be referred to as a seat, uniquely identifies the location of an asset. As discussed above, the process of reconciling the physical inventory records with the main asset management database, while preferably taking a very short time, may also include work over several days in which each day some of the physical inventory data may be reconciled with old data and updates made to the main asset management database. Preferably, each accepted record written back to the main asset management database has a seat code that does not include the appended indicia. Thus, once reconciliation of the physical inventory to the main asset management database is complete, the user need only scan the main asset management database for assets at the seat codes still including the identifying indicia. Any entries at seats still having the identifying indicia were not identified in the physical inventory of the computing assets. This embodiment of the invention also envisions producing a record of new assets added to the main asset management database by use of the physical inventory/web acceptance method by producing audit trails of each update to the main asset management database. Thus, new assets added to the database may be identified through the audit trails.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a components, software and methods by different names. This document does not intend to distinguish between components, software and methods that differ in name but not function.

In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION OF THE PREFERRED EMBODIMENTS

In broad terms, the preferred embodiments of the present invention address reconciling physical inventory of computing resources against a main asset management database with sufficient efficiency that the reconciliation process can produce an updated main asset management database in a time span shorter than the assets and asset locations are subject to change. Given that the preferred embodiment is directed to computing resources, this time frame must be relatively short. While the preferred embodiments were developed in the context of managing computing assets, and they will be described in that context, it must be understood that the methods and systems described herein could be used for any asset management system and are not limited to tracking just computing assets.

Figure 1:
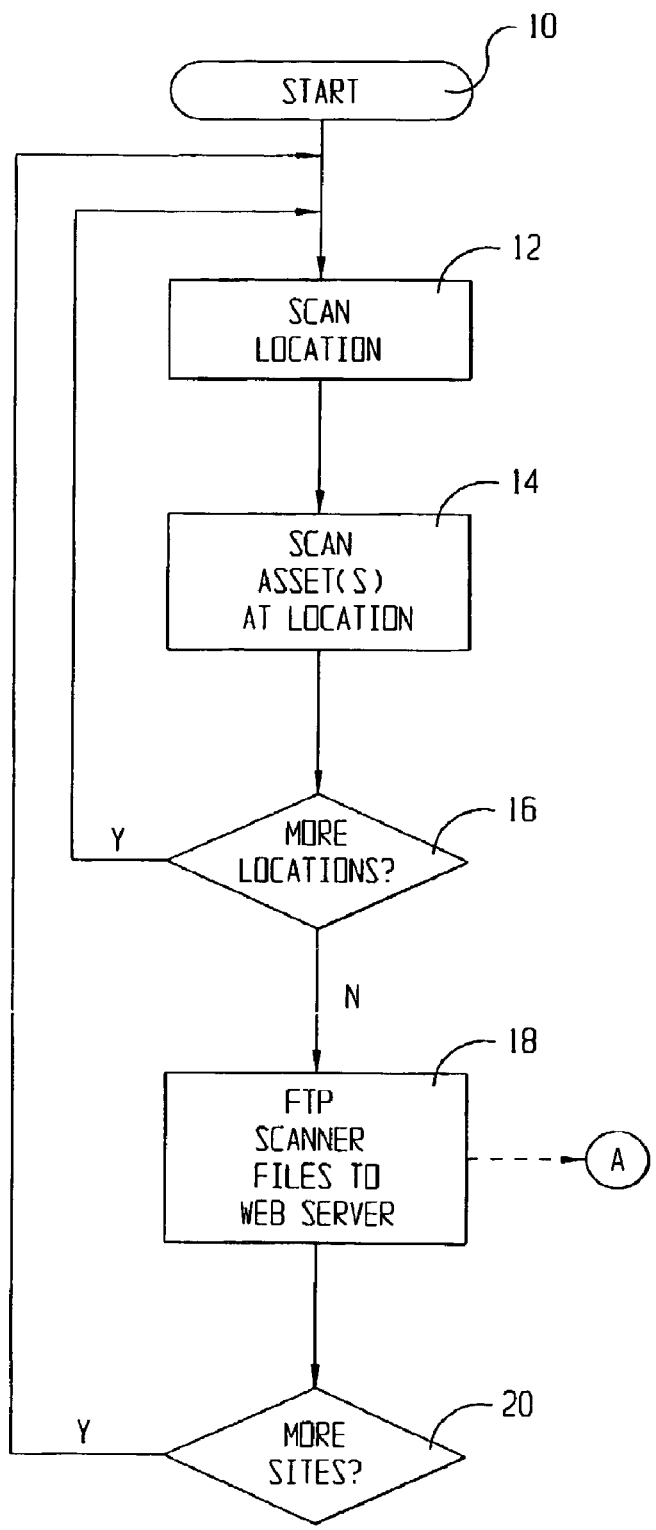
FIG. 1 shows a flow diagram of a first portion of the steps of the preferred embodiment.

FIG. 1 shows a flow diagram of a first portion of the preferred embodiments of the invention. The process starts at block 10. A first step of receiving and reconciling physical inventory data preferably starts by scanning a location code identifying a particular location, as indicated at block 12. In the context of taking a physical inventory of computing devices, this location preferably refers to a place, within the corporation or within a particular site of a corporation, where computing assets are placed. The location, which may also be referred to as a seat, uniquely identifies its location. The location code is preferably such that it may be represented in a bar code format which may be scanned by typical scanners. The step of recording the location of the computing asset is preferably accomplished by way of a hand held scanner capable of reading bar codes and storing read information within scanner memory. The location may also provide an index to provide owner name information, or the owner name may be entered by way of the scanner. Although any of an array of scanners may be utilized in this capacity, the preferred method and system involve the use of a scanner made by Point of Sale System Services, 40 Jytek Drive, Leominster, Mass. 01453-5966. The particular model of the scanner used from this supplier was the Ultra, advertised as a programmable bar code scanner with display, key pad and bar code printer.

After scanning a location code, the next step in the physical inventory process preferably comprises scanning asset codes of computing assets at the particular location, as indicated at block 14. If, for example, the location under scrutiny is an office of an individual, there may be many computing assets within the office including, but not limited to, a computer, a docking station if the computer is portable, a display device, printers and scanners. Much like scanning the location codes above, preferably each computing asset has a bar code attached thereon with a unique asset code. Thus, scanning the asset code is as simple as using the hand held scanner to read the information. Also, the bar code may and preferably does identify the serial number of the device, which may further be used for tracking purposes. Regardless of the number of individual computing assets, preferably each of those are scanned as indicated at block 14. The scanner used preferably links together all the information regarding computing assets scanned at a particular location with the location code.

The next step, still referring to FIG. 1, is to continue the process at other locations within the corporation or particular site. Additional locations and related computing resources are scanned as indicated by the combination of blocks 16, 12 and 14. Once a sufficient number of locations within the corporation, or portion of the corporation, have been scanned, the next step in the process is to transfer the information stored in the hand held scanner, scanner files, to a predefined location on a web server, as indicated in block 18.

Figure 3:
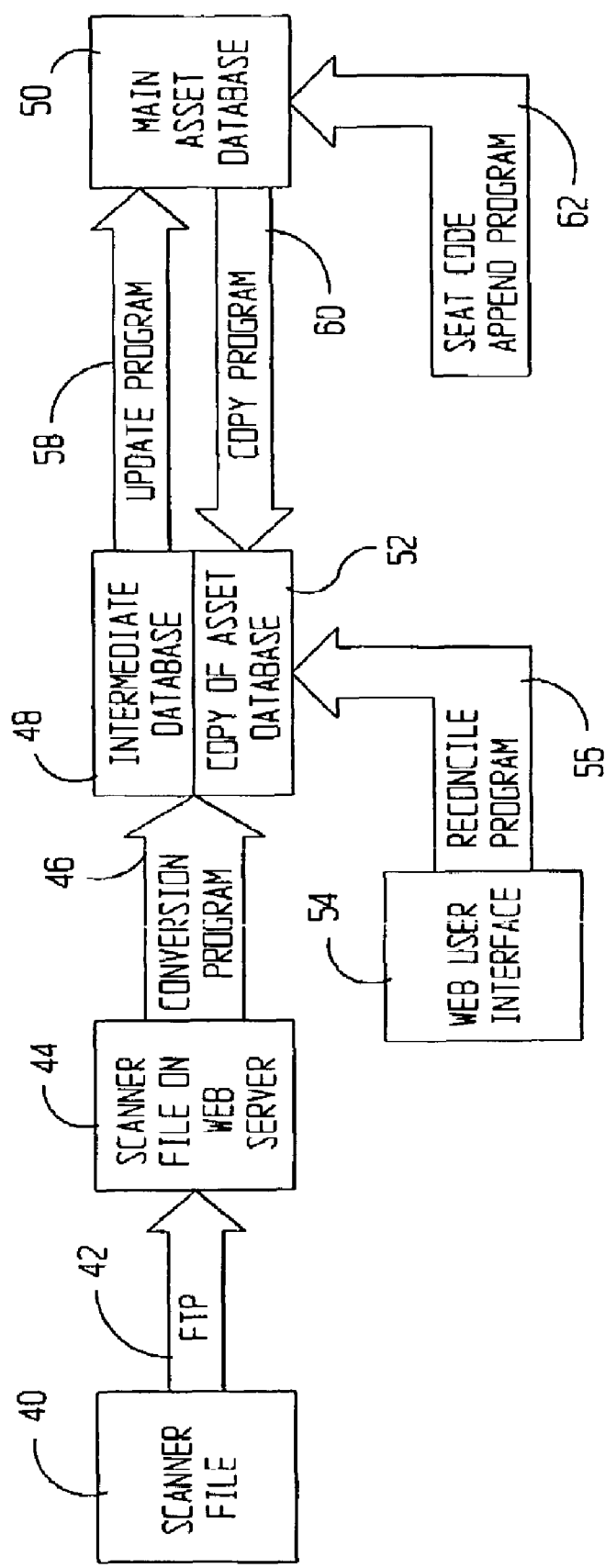
FIG. 3 is a block diagram showing the interaction of various files, programs, and systems of the preferred embodiments.

Referring now to FIG. 3, there is shown, in block diagram form, interaction of various files, programs and systems of the preferred embodiment. With regard to the transfer of the scanner files from the hand held scanner to the web server as indicated in block 18 of FIG. 1, FIG. 3 shows that the scanner file 40 is preferably transferred by means of an FTP program, as indicated by arrow 42, to a particular file location on a web server. Although the preferred method is an FTP transfer, other methods to transfer the information from the hand held scanner to the web server may be used, e.g., having a hand held scanner capable of broadcasting that information using electromagnetic waves, or the information could be copied to a disk or other semi-permanent storage device and then manually moved between the hand held scanner and the directory in the web-based served. Further, there may be intermediate steps between the scanner file located on the hand held scanner and the web-based server, including transferring that information to other computers, such as a laptops or desktop device, which in turn transfer the information to the desired location on the web-based server.

In the preferred embodiment, the information obtained by the scanner is preferably a comma delimited ASCII text file. While this is the preferred embodiment, one of ordinary skill in the art could easily devise many file structures which could equivalently contain the information.

Figure 2:
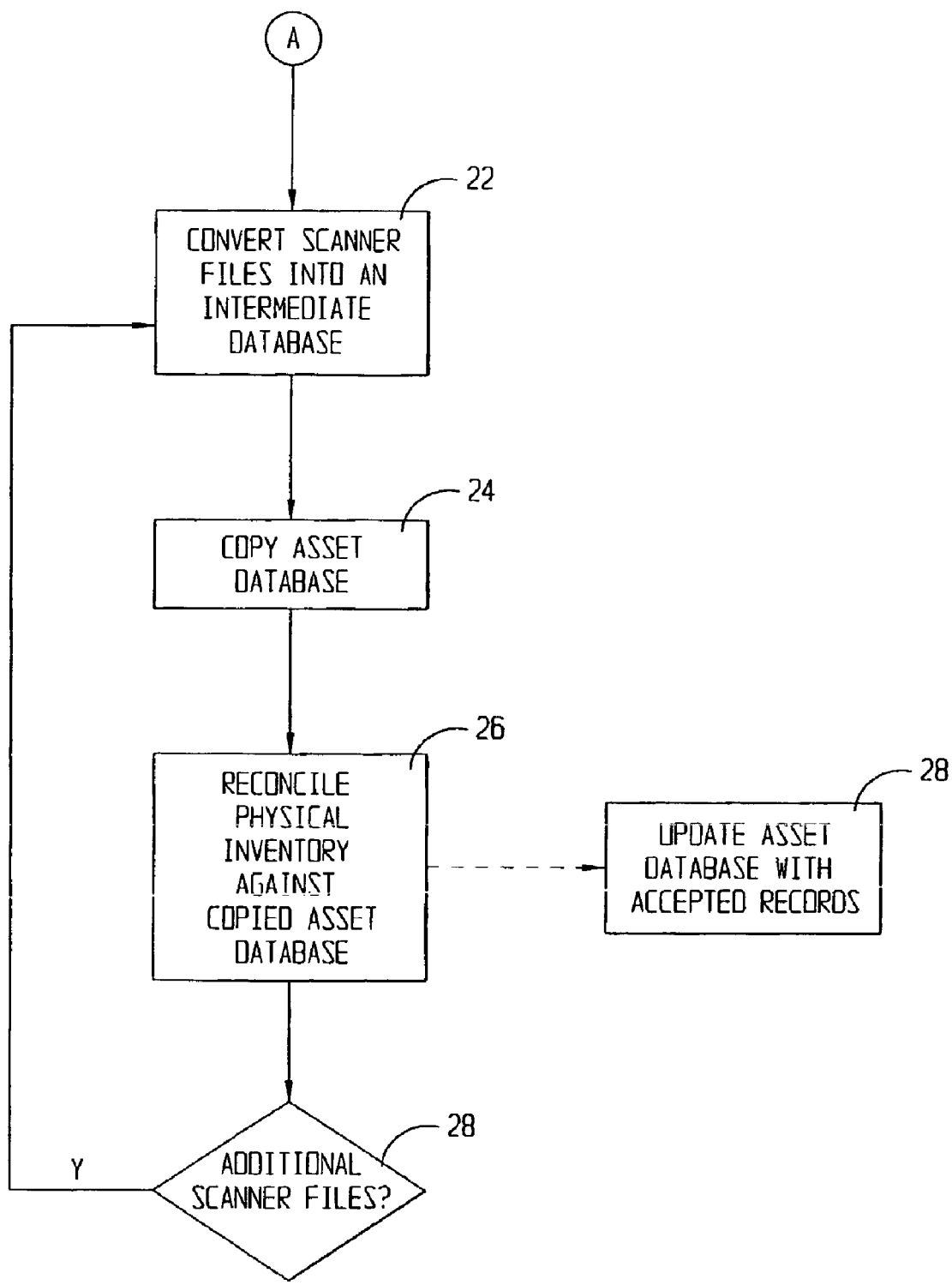
FIG. 2 shows a flow diagram of a second portion of the steps of the preferred embodiment.

Referring now to FIG. 2, there is shown a second portion of the exemplary physical inventory reconciliation. In particular, after transferring the comma delimited ASCII text file held in a hand held scanner to the web server, as indicated by the dashed line and arrow of FIG. 1 proceeding from block 18, the next step in the process is preferably to convert the scanner files into an intermediate database, as indicated in block 22.

Referring again to FIG. 3, block 44 exemplifies the raw scanner or raw inventory information from the hand held scanner placed in the particular location on the web server. As indicated by the arrow 46 of FIG. 3, a conversion program preferably takes the scanner file on the web server and converts it to the intermediate database 48. In the preferred embodiments, the intermediate database is preferably an SQL format database. While this is the preferred database, any suitable database format may be used. Indeed, it would even be possible to implement the invention where the database is simply some form of delimited ASCII text. Preferably, the intermediate database resides somewhere on the web server that held the scanner file. In the preferred embodiments of the present invention, the conversion program 46, when converting the ASCII text scanner file to an intermediate database, also creates additional database fields associated with each record. These additional fields comprise at least a date field and a user field. During the reconciliation process these fields are updated to indicate the date that each record was updated and the person performing that update. In this way, complete audit trails may be made respecting changes to the assets of the corporation.

As is inherent in the flow diagrams of FIGS. 1 and 2, the process of the preferred embodiment does not necessarily proceed forward with only a single task operating at any one time. In particular, and as FIG. 1 indicates, additional physical inventory tasks may take place while the steps of reconciling previously obtained information takes place, and as discussed more fully below with respect to FIG. 2. In this regard, the conversion program 46, which is preferably a visual basic program written to perform the steps outlined herein, is programmed to periodically check the particular location in the web based server where the raw scanner files will be placed. The conversion program 46 may check for the presence of a scanner file hundreds or thousands of times before finding that scanner information has been placed in the particular directory. Upon finding a file containing that information, the conversion program performs the conversion from the preferred comma delimited ASCII text file as raw scanner data into an SQL database, to be the intermediate database 48.

Referring again to FIG. 2, preferably the next step in the process is copying the main asset database, as indicated in block 24. The main asset database 50 (FIG. 3) is the database that contains all the asset management information regarding computing resources (or any other assets that need to be tracked). In the preferred embodiment, this database is an SQL database, however, as discussed above with respect to the intermediate database, any database format may be equivalently used. Copying of the main asset database is done so that the records contained in the intermediate database 48 may be compared to and reconciled against this copy of the asset management database 52.

Referring again to FIG. 2, the next step preferably involves reconciling the physical inventory as embodied in the intermediate database 48, against the corresponding records in the copy of the main asset management database, as indicated at block 26 of FIG. 2. With reference to FIG. 3, reconciling the physical inventory against the copied asset database preferably takes place by way of a web user interface 54. That is to say, a person or persons responsible for reconciling the physical data against the corresponding entries in the asset management database preferably performs this task by means of web access. Web access is preferably provided by an Internet Explorer® web browser, however, any available web browser may be used for this purpose. By way of the web browser, the person responsible for reconciling the physical inventory data against that of the main asset database invokes a reconcile program 56. The reconcile programs initially ask for a user ID and password, which are then preferably used for creating audit trails as to changes in the main asset database. Once past the log-in stage, the reconcile program invoked by the web browser, preferably written in HTML or ASP programming language, pulls corresponding records from the intermediate database 48 and the copy of the main asset database 52 and displays that information on the screen. While it may be possible to identify "corresponding assets" by any of a number of identifying indicia, preferably the asset code is used for making this determination. Consider for purposes of example, and without limitation, that at a particular location within the physically inventoried location that a laptop computer has an asset code 111. In the physical inventory, this asset code is associated with a location where that asset was found. Preferably the reconcile program 56 pulls corresponding entries from the intermediate database 48 and the copy of the asset database 52 based on this asset code. If the particular laptop computer with the exemplary asset code 111 is in the same location as of the physical inventory as reflected in the asset database, then no change is required with respect to that asset, and thus the record is marked as accepted.

Consider also the situation where the exemplary laptop computer with asset code 111 is found in a different location in the physical inventory than is reflected in the asset database. In this case, the person reconciling the records may accept that the new location is correct, may reject that record, or may make no change to the asset's location, regardless of the physical inventory. If, however, the person reconciling the physical inventory against the asset database believes that the physical inventory is correct, the location code associated with that asset may be updated and that particular record marked as accepted.

Once reconciliation has completed with respect to all the assets found, the process of reconciling records may continue again, as indicated by block 28. Here again, decision block 28 of FIG. 2, much like decision block 20 of FIG. 1, is indicative of the fact that the preferred embodiments of the present invention are not limited to performing a single task at any one time. Thus, while one person is taking the physical inventory as indicated in the steps of FIG. 1, a second person may be reconciling the data obtained from a previous portion or previous physical inventory, the steps represented in FIG. 2.

Once reconciliation of a particular set of data is complete, that data is preferably written to the main asset database as indicated in block 30. Referring again to FIG. 3, an update program 58 periodically scans for accepted records in the intermediate database 48. When accepted records are found, the update program 58 preferably copies or moves the accepted records from the intermediate database to the main asset database 50. The update program 58 of the preferred embodiments was written in visual basic, however, any programming language may be to create a program for this task.

Moreover, in the preferred embodiment, the conversion program 46 and the update program 58 are embodied in a single computer program.

Referring anew to FIG. 3, the process is described again briefly so as to tie together all the various components and programs. In particular, the scanner file 40 is preferably the comma delimited ASCII text files containing the physical inventory data gathered by the hand held scanner. The physical inventory data comprises at least a location code and asset code for each of the computing assets inventoried. At any time in the physical inventory process, the information held within the hand held scanner may be transferred to a particular directory on a web server, as indicated in block 44. Preferably this transfer is by FTP, but the mechanism of the transfer of the data in the scanner file may take many forms. A conversion program 46 checks for the presence of raw scanner data in the particular directory of the web server on a periodic basis. When the conversion program 46 finds a transferred scanner file, the conversion program 46 preferably converts the scanner file into an intermediate database 48. If multiple people are performing the physical inventory, after transfer of the scanner file 40 to the particular place on the web server 44, the person responsible for gathering the physical inventory data may continue that process while another person performs the reconciliation process. The person responsible for reconciling the scanner data against the old data preferably accomplishes this task by way of a web user interface 54. Through this web user interface 54, a reconcile program 56 is invoked. Just prior to the reconciliation process, or possibly even triggered by it, a copy program 60 preferably copies the main asset database 50 to become the copy of the asset database 52. Through the use of the reconcile program 56, corresponding records are displayed, preferably based on asset codes, between the intermediate database 48 and the copy of the asset database 52. Differences between the corresponding records in the intermediate database 48 and the copy of the asset database 52 are preferably highlighted for easy recognition by the user. The physical inventory data may thus be accepted or rejected, but if accepted, the particular record is marked as such. Preferably an update program 58 checks the intermediate database 48 for accepted records, and if any are found, that update program writes the new data to the main asset database 50. It is noted that, while not preferred, reconciliation may also take place directly against the main asset management database without departing from the spirit and scope of the invention.

Now understanding the process steps and programs involved in reconciling the physical inventory data against the main asset database, it is seen that this system and related method has significant advantages over prior art "manual" methods of reconciling physical inventory against asset databases. It is also seen that while described in the context of computing resources, the system and method is easily applicable to a variety of assets, e.g., assets of a retail store or wholesale warehouse.

A second aspect of the invention involves determining, from reconciliation to reconciliation, which computing resources or assets were not found in the physical inventory. In the preferred embodiment, making this determination involves invoking a seat code append program 62 (FIG. 3). This seat code append program preferably modifies the main asset database 50 in such a way that any particular asset code that was not updated in the one or more reconciliation processes may be quickly and easily identified.

More particularly, the seat code append program 62, preferably a visual basic program, appends to each seat or location code in the main asset database 50 an identifying indicia. In the preferred embodiment, preferably a code "WH" is appended to the end of each seat code. As assets are identified in the reconciliation process, the found assets are written to the main asset database 50 associated with new locations, locations without the identifying indicia. If all assets associated with a location having the "WH" are transferred to new locations, the location with the identifying indicia is completed removed. Once the overall physical inventory and reconciliation process is complete, the user need only scan the main asset database for any remaining at seats with the identifying indicia, the "WH" appended to their asset code. Simply put, these remaining at seats still having the identifying indicia were not found in the physical inventory, and may require additional work.

Figure 4:
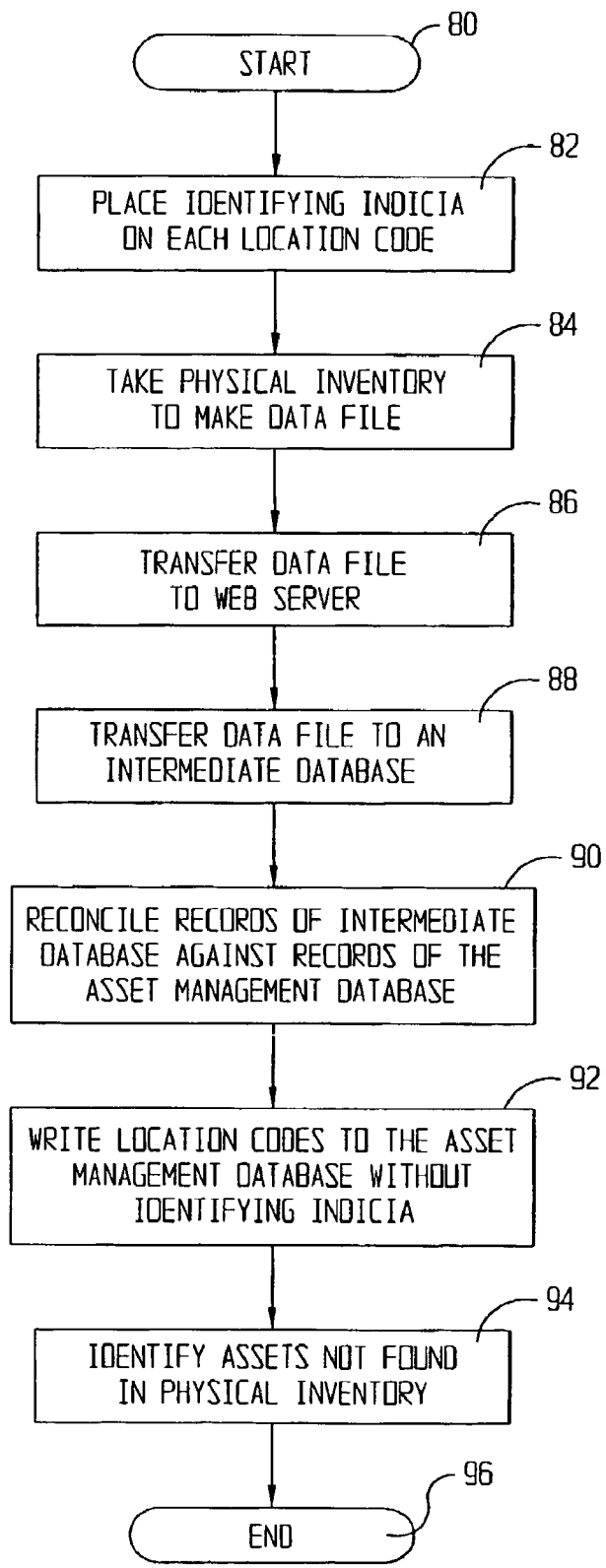
FIG. 4 shows a flow diagram of embodiments of the invention.

Referring now to FIG. 4, the process is described again briefly, tying together the use of the identifying indicia. In particular, the process may start (step 80) and proceed to placing identifying indicia on each location or seat code in the asset management database (step 82). A physical inventory may be taken using a portable bar code scanning device that saves physical inventory data in a data file (step 84). At various times throughout the physical inventory, the data file may be transferred to a web server (step 86). Data in the data file may be transformed into an intermediate database (step 88), and records in the intermediate database may be reconciled against corresponding records in the asset management database (step 90). For the assets found, records may be written to the asset management database without the identifying indicia (step 92). Thus, identifying assets not found during the physical inventory may be accomplished by identifying seat codes in the asset management database that still have the identifying indicia.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method of reconciling physical inventory against an asset management database, the method comprising:
   placing identifying indicia on each location code in the asset management database;
   taking a physical inventory;
   creating raw inventory data;
   transferring the raw inventory data to a web server;
   converting the raw inventory data into an intermediate database;
   creating a copy of the asset management database;
   reconciling records in the intermediate database against corresponding records in the copy of the asset management database by way of a web browser; and
   updating the asset management database with records accepted during the reconciling by writing location codes, associated with assets, to the asset management database without the identifying indicia; and
   identifying assets not found during the physical inventory in the asset management database by identifying location codes having the identifying indicia.

2. The method as defined in claim 1 wherein taking physical inventory and creating raw inventory data further comprises, with a hand held bar code scanning device:
   scanning a location code;
   scanning assets codes associated with that location code;
   repeating the scanning step at a plurality of locations and for a plurality of assets codes;

storing the location codes and the asset codes in the hand held bar code scanning device.

3. The method as defined in claim 2 wherein storing the location codes and the asset codes in the hand held bar code scanning device further comprises storing the location codes and the asset codes in a file in the hand held bar code scanner.

4. The method as defined in claim 3 wherein storing the location codes and asset codes in a file further comprises storing the location codes and asset codes in a comma delimited ASCII text file.

5. The method as defined in claim 3 wherein transferring the raw inventory data to a web server further comprises copying the file to a web server using a file transfer protocol (FTP) program.

6. The method as defined in claim 3 wherein transferring the raw inventory data to a web server further comprises:
    moving the file to an intermediate device; and then
    copying the file from the intermediate device to the web server.

7. The method as defined in claim 6 wherein moving the file to an intermediate device further comprises broadcasting the file using electromagnetic waves.

8. The method as defined in claim 6 wherein moving the file to an intermediate device further comprises:
    copying the file to a storage device; and then
    copying the file from the storage device to the intermediate device.

9. The method as defined in claim 8 wherein copying the file to a storage device further comprises copying the file to a floppy disk.

10. The method as defined in claim 6 wherein moving the file to an intermediate device further comprises moving the file to a computer system having an internet connection.

11. The method of as defined in claim 1 wherein converting the raw inventory data into an intermediate database further comprises converting the raw inventory data into the intermediate database being a structured query language (SQL) format database having fields for location codes and associated asset codes.

12. The method as defined in claim 11 further comprising creating additional fields associated with each asset code to identify a person who performs the reconciliation step.

13. The method as defined in claim 1 wherein reconciling records in the intermediate database against corresponding records in the copy of the asset management database by way of a web browser further comprises:
    invoking a web browser program;
    entering a user identification;
    entering a password;
    displaying corresponding records between the intermediate database and the copy of the asset management database;
    reconciling the corresponding records creating reconciled records; and
    marking at least some of the reconciled records as accepted.

14. The method as defined in claim 13 wherein invoking a web browser program further comprises invoking an Internet Explorer® web browser.

15. The method as defined in claim 13 wherein displaying corresponding records between the intermediate database and the copy of the asset management database further comprises:
    displaying a record from the intermediate database based on an asset code; and
    displaying a record from the copy of the asset management database based on the asset code.

16. The method as defined in claim 13 wherein updating the asset management database with records accepted during the reconciling step further comprises copying to the asset management database reconciled records marked as accepted.

17. The method as defined in claim 1 wherein taking a physical inventory further comprises taking a physical inventory of computer assets.

18. A method of taking a physical inventory and reconciling the physical inventory against an asset management database, the method comprising:
    scanning with a hand held scanner bar codes identifying locations and bar codes identifying assets to create inventory data;
    transferring the inventory data from the hand held scanner to a web server;
    converting the inventory data into an intermediate database;
    placing an identifying indicia on a portion of each record in the asset management database; and then
    making a copy of the asset management database available on the web server;
    reconciling records in the intermediate database against corresponding records in the copy of the asset management database on the web server by way of a web browser; and
    updating the asset management database with records accepted during the reconciling by: writing the updated records without the identifying indicia.

19. The method as defined in claim 18 further comprising, after reconciling is complete:
    searching the asset management database for records having the identifying indicia; and thereby
    identifying assets that were not found during the physical inventory.

20. The method as defined in claim 18 wherein placing an identifying indicia on a portion of each record in the asset management database further comprises appending a code to the end of each seat code.

21. The method as defined in claim 18 wherein scanning with a hand held scanner bar codes identifying locations and bar codes identifying assets further comprises:
    scanning a plurality of bar codes identifying locations; and
    scanning a bar code identifying at least one asset associated with each location.

22. The method as defined in claim 21 wherein creating inventory data further comprises storing the bar codes identifying the locations and also storing the bar codes identifying assets in a file in the hand held scanner.

23. The method as defined in claim 22 wherein transferring the inventory data from the hand held scanner to a web server further comprises transferring the file from the hand held scanner to the web server.

24. The method as defined in claim 23 wherein transferring the file from the hand held scanner to the web server further comprises transferring the file using a file transfer protocol (FTP) program.

25. The method as defined in claim 23 wherein transferring the file from the hand held scanner to the web server further comprises;
    transferring the file from the hand held scanner to an intermediate device; and
    transferring the file from the intermediate device to the web server using the FTP protocol.

26. The method as defined in claim 25 wherein transferring the file from the hand held scanner to the intermediate device further comprises:

copying the file to a disk; and then copying the file from the disk to the intermediate device.

27. The method as defined in claim 25 wherein transferring the file from the hand held scanner to the web server further comprises;

transferring the file from the hand held scanner to a laptop computer; and transferring the file from laptop computer to the web server using the FTP protocol.

28. The method as defined in claim 18 wherein converting the inventory data into an intermediate database further comprises converting the inventory data into a structured query language (SQL) database resident on the web server.

29. A method of reconciling a physical inventory of assets against an asset management database and identifying assets not located in the physical inventory, the method comprising:

placing identifying indicia on each location code in the asset management database;

taking the physical inventory using a portable bar code scanning device that saves physical inventory data in a data file within the portable bar code scanning device;

transferring the data file to a web server;

transforming the data file into an intermediate database;

reconciling records of the intermediate database against corresponding records in the asset management database;

writing location codes, associated with assets, to the asset management database without the identifying indicia; and identifying assets not found during the physical inventory in the asset management database by identifying location codes having the identifying indicia.

30. The method as defined in claim 29 wherein placing identifying indicia on each location code in the asset management database further comprises appending a code to the end of each location code.

31. The method as defined in claim 29 wherein taking the physical inventory using a portable bar code scanning device that saves physical inventory data in a data file within the portable bar code scanning device further comprises, at a plurality of locations:

scanning a location code that uniquely identifies the location; and scanning at least one asset code of an asset at the location.

32. The method as defined in claim 29 wherein transferring the data file to a web server further comprises:

coupling the portable bar code scanning device to an internet connection; and transferring the data file to the web server using an FTP program.

33. The method as defined in claim 29 wherein reconciling records of the intermediate database against corresponding records in the asset management database further comprises:

making a copy of the asset management database residing on the web server;

reconciling records in the intermediate database against corresponding records in the copy of the asset management database.

\* \* \* \* \*

UNITED STATES PATENT AND TRADEMARK OFFICE
CERTIFICATE OF CORRECTION

PATENT NO. : 7,624,034 B2  Page 1 of 1
APPLICATION NO. : 09/997340
DATED : November 24, 2009
INVENTOR(S) : Robert A. Botham et al.

It is certified that error appears in the above-identified patent and that said Letters Patent is hereby corrected as shown below:

In column 9, line 16, in Claim 6, delete "comprises;" and insert -- comprises: --, therefor.

In column 9, line 34, in Claim 11, after "method" delete "of".

In column 10, line 60, in Claim 25, delete "comprises;" and insert -- comprises: --, therefor.

In column 11, line 5, in Claim 27, delete "comprises;" and insert -- comprises: --, therefor.

Signed and Sealed this

Twenty-third Day of March, 2010

David J. Kappos
*Director of the United States Patent and Trademark Office*